Nov. 28, 1933. J. D. JONES 1,937,151
VERTICAL BEARING
Filed Jan. 12, 1931
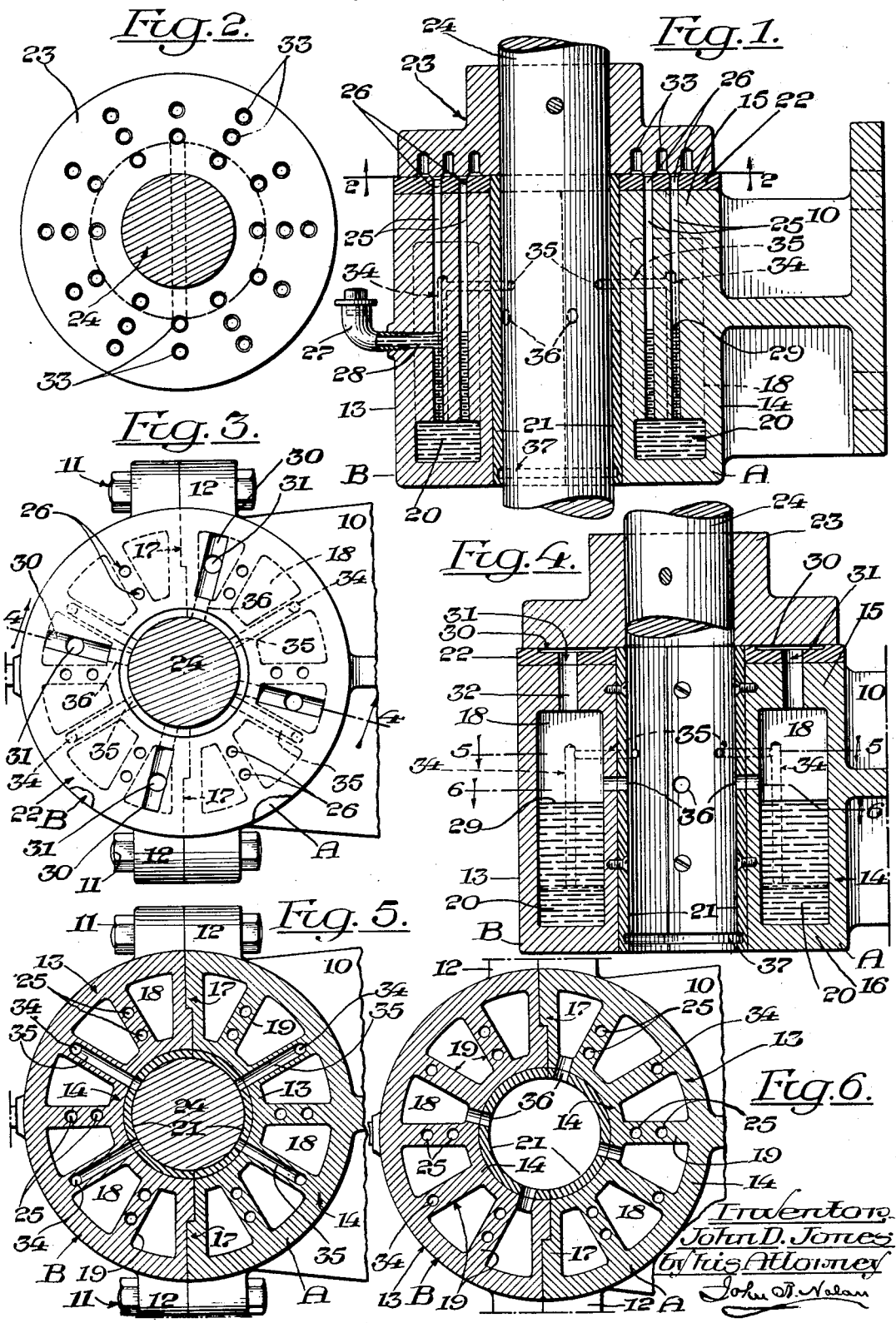

Patented Nov. 28, 1933

1,937,151

UNITED STATES PATENT OFFICE 1,937,151

VERTICAL BEARING

John D. Jones, Portland, Oreg.

Application January 12, 1931. Serial No. 508,186

8 Claims. (Cl. 308—170)

The present application is a continuation in part of my application Serial No. 361,034, filed May 7, 1929.

This invention relates to bearings, having reference more especially to self-lubricating bearings for vertical shafts.

An object of my invention is to provide a simple and efficient bearing wherein oil will be circulated between an oil reservoir and the wearing surfaces of the bearing.

A further object is to provide a bearing that will be easy to manufacture, be rugged in structure, and will require little or no attention for long periods of time while in service.

A further object is to provide a bearing that will be self-lubricating regardless of the direction of rotation of the shaft, its speed of rotation or the direction in which the load is applied.

A further object is to provide a bearing that will not leak or waste lubricant.

With these and other objects in view my invention comprises a bearing embodying features of novelty which will be hereinafter described, the scope of the invention then being defined in the appended claims.

In the drawing—

Figure 1 is a vertical section of a form of bearing embodying the principle of my invention, showing a portion of the associated shaft and its thrust member.

Fig. 2 is a transverse section between the bearing and the thrust member of the shaft, as on the line 2—2, Fig. 1, looking upward.

Fig. 3 is a similar section on the same line, looking downward.

Fig. 4 is a transverse vertical section, as on the line 4—4 of Fig. 3, the portion of the shaft in the bearing being broken away.

Figs. 5 and 6 are transverse sections, as on the lines 5—5 and 6—6, respectively, of Fig. 4, the shaft being shown in Fig. 5.

Referring to the drawings, A, B designate two complementary parts constituting a housing, whereof the part A is formed on a supporting bracket 10 and the part B is detachably secured to the part A by bolts 11 passing through suitably located lugs 12 on the respective parts.

In the form illustrated each of the parts comprises spaced outer and inner segmental walls 13, 14, respectively, and also top and bottom portions 15, 16, respectively. These walls are joined at their edges by radial webs 17 which are preferably offset as shown to afford an interlocking of the abutting surfaces of the associated parts A and B. The space between the outer and inner walls of each part of the housing is divided into a plurality of vertical wells 18 by means of spaced radial webs 19 which terminate short of the bottom 16, thus affording a basal oil reservoir 20 interconnecting and forming a continuation of the series of wells.

Within the inner walls of the parts A, B bearing liners 21 are secured, and upon the top of the associated parts is suitably mounted and secured a bearing or thrust-opposing plate 22 on which rests the thrust member 23 of a vertical shaft 24 which is mounted to rotate in the bearing, as seen in Fig. 1.

Passing vertically through each of the alternate webs 19 and the top of the housing are holes 25 which communicate with corresponding holes 26 extending through the bearing plate 22, thus affording ducts through which oil is carried from the reservoir to the upper surface of the plate by the pumping action which is set up by the rotation of the thrust member 23 on the apertured surface of the plate 22. In this way a continuous supply of oil is maintained between the opposing surfaces of the thrust member and the plate 22, and this irrespective of the direction of rotation of the shaft.

The outer wall 13 of one of the housing parts is provided at a suitable height with an oil filler 27 which communicates with a passage 28 in the wall leading to one of the ducts 25. This filler determines the oil level 29 within the wells.

The upper surface of the plate 22 is provided at spaced intervals with radially-disposed shallow pits or depressions 30 in the bottoms of which are scavenging holes 31 which communicate with holes 32 formed in the top 15 of the housing and leading to the underlying wells. Hence the excess oil between the opposing surfaces of the members 22 and 23 enters the pits or depressions and returns by gravity through the holes 31, 32 to the oil in the wells 18 and reservoir 20 where it has an opportunity to dissipate any collected heat before it is again carried to the wearing surface of the thrust-opposing plate 22.

The lower or wearing surface of the thrust member 23 is formed with well-distributed sockets 33 which afford a multiplicity of oil-collecting pockets effective to insure a thorough and reliable distribution of the lubricant between the relatively moving contact surfaces of the thrust and bearing members.

The webs 19 adjacent those in which the holes 28 are formed, are provided with vertical holes 34 which extend from the bottom to a plane above the oil level 29, and communicate with radial holes 35 formed in such webs and leading to the surface of the shaft 24 which is mounted in the bearing. The holes 34, 35 thus afford ducts leading from the reservoir to the surface of the shaft. Hence relative rotation between the shaft and the inner surface of the bearing liners 21 creates a suction and causes a pump action effective to draw up the oil from the reservoir and deliver it through certain of the ducts 34, 35 to the surface of the shaft depending on which portion of the bearing pressure is exerted by the shaft, whence it is distributed throughout the film space between the bearing liners and the shaft as well as to the film space between the co-acting surfaces of the thrust member 23 and plate 22.

Scavenging holes 36 connect the wells 18 with the surface of the shaft between the holes 35 and the oil level 29, and hence the surplus oil on the shaft surface instead of wasting away escapes through the holes 36 and passes by gravity to the oil wells and basal reservoir wherein it is cooled before being pumped upward to the wearing surfaces.

The particular set of ducts 34, 35 through which the oil is delivered to the shaft surface depends on several factors, namely, the direction in which the load is applied, the direction of rotation, and partially the speed of rotation, which factors vary in importance somewhat in relation to their magnitude.

From the foregoing it will be seen that by an exceedingly simple construction I am enabled not only properly to lubricate the thrust and guide members of the bearing regardless of the direction of load and the direction of rotation or speed of rotation of the shaft, but I am also able quickly and thoroughly to dissipate any collected heat in the oil before its passage to the respective wearing surfaces of the bearing.

It will also be seen that in certain classes of work where it is important that no oil shall escape, such as printing presses, paper machinery and the like, this construction is highly desirable, since no oil can escape from either end of the bearing owing to the fact that when the oil reaches a certain point in its downward travel it is returned to the reservoir and when it reaches another point on its downward travel on the bearing it is intercepted and returned to the reservoir.

It is desirable to provide an oil groove 37 near the lowermost end of the bearing in order completely to seal the bearing against leakage.

It is to be understood that my invention is not limited to the specific details of construction herein described, as the structure may be variously modified within the principle of my invention and the scope of the appended claims.

I claim—

1. In a bearing for a vertical shaft having a thrust member, a housing having at the top thereof a thrust-opposing member and at the bottom an oil reservoir, and a plurality of upright ducts communicating between said reservoir below the level of the contained oil and the space between the wearing surfaces of the thrust-opposing member and the thrust member, whereby the relative rotation of said members effects the lifting of oil from the reservoir to and between the co-acting thrust surfaces there being a plurality of scavenging openings extending from the space between the thrust member and the thrust-opposing member to the oil reservoir above the level of the oil.

2. In a bearing for a vertical shaft having a thrust member, a housing having at the top thereof a thrust-opposing member and at the bottom an oil reservoir, and a plurality of upright ducts communicating between said reservoir and the wearing surface of the thrust-opposing member, whereby the relative rotation of said members effects the lifting of oil from the reservoir to and between the co-acting thrust surfaces, said thrust-opposing member having scavenging holes whereby a surplus of oil thereon can return to the oil reservoir.

3. In a bearing for a vertical shaft having a thrust member, a housing having at the top thereof a thrust-opposing member and at the bottom an oil reservoir, and a plurality of upright ducts communicating between said reservoir and the wearing surface of the thrust-opposing member, whereby the relative rotation of said members effects the lifting of oil from the reservoir to and between the co-acting thrust surfaces, said thrust-opposing member having surface depressions and scavenging holes whereby a surplus of oil can return to the oil reservoir.

4. The combination with a vertical shaft having a thrust member provided in its acting surface with oil pockets, of a housing having at its top a thrust-opposing member with which the thrust member co-acts, an oil reservoir, and a plurality of upright ducts communicating between said reservoir and the wearing surface of the said thrust-opposing member, said thrust-opposing member having scavenging holes whereby a surplus of oil thereon can return to the oil reservoir.

5. In a self-lubricating bearing for a vertical shaft having a thrust member, a housing having at the top thereof a thrust-opposing member, a vertical bearing portion within said housing, an oil reservoir encircling said bearing portion, and a plurality of upright ducts communicating between said reservoir and the wearing surface of the thrust-opposing member whereby the relative rotation of said members effects the lifting of the oil from the reservoir to and between the thrust surfaces, said thrust-opposing member having scavenging holes whereby a surplus of oil thereon can return to the oil reservoir.

6. A vertical bearing having a plurality of vertical oil wells formed around the same, a top plate on said bearing affording a thrust surface, a plurality of oil ducts communicating between the lowermost portion of said wells and a higher portion of the wearing surface of the bearing, a plurality of oil ducts communicating between the lowermost portion of said wells and the said thrust surface, said top plate and bearing having scavenger holes therein in communication with the oil wells.

7. A vertical bearing having in combination a two-part housing, means for securing the parts together, each part having spaced apart webs which provide a plurality of vertical wells communicating with each other at the bottom and affording a continuous reservoir around each half of the bearing, and a top on the housing affording a thrust surface, certain of said webs having vertical holes therein rising from the oil reservoir and having horizontal holes connecting the top of said vertical holes with the wearing surface of the bearing, and certain of said webs having vertical holes therein leading from the wells to the said thrust surface, said top on the housing having scavenging holes therein through which oil can return to said oil wells, and said bearing also having radial scavenging holes located below the said horizontal holes and communicating between the wearing surface of the bearing and said oil reservoir.

8. A self-lubricating bearing structure for a vertical shaft having a thrust member, said structure comprising a housing having at the top thereof a thrust-opposing member, a vertical bearing within said housing, a plurality of vertical oil wells formed around said bearing and intercommunicating at the bottom to afford an oil reservoir, a plurality of oil ducts communicating between the lowermost portion of said wells and the wearing surface of the vertical bearing, said bearing having scavenging holes therein whereby a surplus of oil can return from such wearing surface to the reservoir, and a plurality of oil ducts communicating between the lowermost portion of said wells and the wearing surface of the thrust-opposing member, said thrust-opposing member having scavenging holes therein whereby a surplus of oil thereon can return to the reservoir.

JOHN D. JONES.